(12) United States Patent
Wen et al.

(10) Patent No.: US 11,461,995 B2
(45) Date of Patent: Oct. 4, 2022

(54) METHOD AND APPARATUS FOR INSPECTING BURRS OF ELECTRODE SLICE

(71) Applicant: BEIJING BAIDU NETCOM SCIENCE AND TECHNOLOGY CO., LTD., Beijing (CN)

(72) Inventors: Yawei Wen, Beijing (CN); Jiabing Leng, Beijing (CN); Minghao Liu, Beijing (CN); Jiangliang Guo, Beijing (CN); Xu Li, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 509 days.

(21) Appl. No.: 16/683,766

(22) Filed: Nov. 14, 2019

(65) Prior Publication Data

US 2020/0082199 A1    Mar. 12, 2020

Related U.S. Application Data

(63) Continuation of application No. PCT/CN2019/084427, filed on Apr. 26, 2019.

(30) Foreign Application Priority Data

Aug. 10, 2018    (CN) .......................... 201810912648.4

(51) Int. Cl.
*G06V 10/44*    (2022.01)
*G06K 9/62*    (2022.01)

(52) U.S. Cl.
CPC .......... *G06V 10/44* (2022.01); *G06K 9/6256* (2013.01); *G06K 9/6261* (2013.01)

(58) Field of Classification Search
CPC ........ G06V 10/44; G06V 10/26; G06V 10/10; G06K 9/6256; G06K 9/6261; G06K 9/627;
(Continued)

(56) References Cited

FOREIGN PATENT DOCUMENTS

CN    102284431 A    12/2011
CN    202824250 U    3/2013
(Continued)

OTHER PUBLICATIONS

Lee, et al.,"Burr Detection by Using Vision Image," Int J Adv Manuf Technol 8:275-284 (1993).

*Primary Examiner* — Neil R McLean
(74) *Attorney, Agent, or Firm* — Knobbe Martens Olson & Bear LLP

(57) ABSTRACT

Embodiments of the present disclosure provides a method and apparatus for inspecting burrs of an electrode slice. The method may include: acquiring a to-be-inspected electrode slice image; and inputting the to-be-inspected electrode slice image into a pre-trained burr instance segmentation model to obtain inspection result for characterizing whether the electrode slice displayed in the to-be-inspected electrode slice image has burrs and contour of the burrs, where the burr instance segmentation model is used to characterize the corresponding relationship between the electrode slice image and the inspection result and contour information. The method may further include: and outputting, in response to the inspection result for characterizing that the electrode slice displayed in the to-be-inspected electrode slice image has burrs, prompt information for characterizing that the electrode slice displayed in the to-be-inspected electrode slice image has burrs.

18 Claims, 6 Drawing Sheets

(58) Field of Classification Search
CPC . G06T 2207/20081; G06T 2207/20084; G06T 7/001; G06T 7/11; G06N 20/00; G08B 21/18
USPC .......................................................... 706/12
See application file for complete search history.

(56) References Cited

FOREIGN PATENT DOCUMENTS

| | | | |
|---|---|---|---|
| CN | 108229364 A | | 6/2018 |
| CN | 109190636 A | * | 1/2019 |
| JP | 2008145250 A | * | 6/2008 |
| JP | 2010114012 | | 5/2010 |

* cited by examiner

METHOD AND APPARATUS FOR INSPECTING BURRS OF ELECTRODE SLICE

CROSS-REFERENCE TO RELATED APPLICATIONS

This application is a continuation of International Application No. PCT/CN2019/084427, filed on Apr. 26, 2019, which claims priority to Chinese Application No. 201810912648.4, filed on Aug. 10, 2018 and entitled "Method and Apparatus for Inspecting Burrs of Electrode Slice" with applicants of Beijing Baidu Netcom Science and Technology Co., Ltd, the entire disclosures of which are hereby incorporated by reference.

TECHNICAL FIELD

Embodiments of the present disclosure relate to the field of computer technology, and specifically to a method and apparatus for inspecting burrs of an electrode slice.

BACKGROUND

In the production process of batteries, burrs of battery slice are an important factor affecting the quality of batteries. Therefore, burr inspection of the battery slice is an important link of quality inspection. The conventional inspection methods mainly include manual inspection or machine-assisted inspection. The manual inspection mainly relies on empirical observation by technical experts to obtain inspection results. The machine-assisted inspection solidifies some features in an inspection system.

SUMMARY

Embodiments of the present disclosure provide a method and apparatus for inspecting a burr of an electrode slice.

According to a first aspect, some embodiments of the present disclosure provide a method for inspecting a burr of an electrode slice, the method including: acquiring a to-be-inspected image of the electrode slice; inputting the to-be-inspected image of the electrode slice into a pre-trained burr instance segmentation model, to obtain an inspection result for characterizing whether the electrode slice displayed in the to-be-inspected image of the electrode slice has a burr and a contour of the burr, wherein the burr instance segmentation model is used to characterize a corresponding relationship between the image of the electrode slice and the inspection result and the contour; and outputting, in response to the inspection result characterizing that the electrode slice displayed in the to-be-inspected image of the electrode slice has the burr, prompt information for characterizing that the electrode slice displayed in the to-be-inspected image of the electrode slice has the burr.

In some embodiments, the method further includes: associatively storing the to-be-inspected image of the electrode slice, the inspection result and the contour.

In some embodiments, the method further includes: sending the to-be-inspected image of the electrode slice, the inspection result and the contour to a display end; and in response to receiving an annotation on the to-be-inspected image of the electrode slice sent by the display end, determining the to-be-inspected image of the electrode slice as a sample image, determining the sample image and the annotation as a training sample, and adding the training sample to a preset training sample set to generate a new training sample set.

In some embodiments, the burr instance segmentation model is updated by the following steps: for a training sample in the new training sample set, training, using a machine learning method, to obtain a new burr instance segmentation model, with the sample image of the training sample as an input and the input annotation on the sample image as a desired output.

In some embodiments, the method further includes: acquiring a target image of the electrode slice; adjusting the size of the target image of the electrode slice to a preset size; and determining the adjusted target image of the electrode slice as the to-be-inspected image of the electrode slice.

According to a second aspect, some embodiments of the present disclosure provide and apparatus for inspecting a burr of an electrode slice, the apparatus including: a first acquisition unit, configured to acquire a to-be-inspected image of the electrode slice; an inspection unit, configured to input the to-be-inspected image of the electrode slice into a pre-trained burr instance segmentation model, to obtain an inspection result for characterizing whether the electrode slice displayed in the to-be-inspected image of the electrode slice has a burr and a contour of the burr, wherein the burr instance segmentation model is used to characterize a corresponding relationship between the image of the electrode slice and the inspection result and the contour; and an output unit, configured to output, in response to the inspection result characterizing that the electrode slice displayed in the to-be-inspected image of the electrode slice has the burr, prompt information for characterizing that the electrode slice displayed in the to-be-inspected image of the electrode slice has the burr.

In some embodiments, the apparatus further includes: a storage unit, configured to associatively store the to-be-inspected image of the electrode slice, the inspection result and the contour.

e embodiments, the apparatus further includes: a sending unit, configured to send the to-be-inspected image of the electrode slice, the inspection result and the contour to a display end; and a generation unit, configured to determine, in response to receiving an annotation on the to-be-inspected image of the electrode slice sent by the display end, the to-be-inspected image of the electrode slice as a sample image, determine the sample image and the annotation as a training sample, and add the training sample to a preset training sample set to generate a new training sample set.

In some embodiments, the burr instance segmentation model is updated by the following steps: for a training sample in the new training sample set, training, using a machine learning method, to obtain a new burr instance segmentation model, with the sample image of the training sample as an input and the input annotation on the sample image as a desired output.

In some embodiments, the apparatus further includes: a second acquisition unit, configured to acquire a target image of the electrode slice; an adjustment unit, configured to adjust the size of the target image of the electrode slice to a preset size; and a determination unit, configured to determine the adjusted target image of the electrode slice as the to-be-inspected image of the electrode slice.

According to a third aspect, some embodiments of the present disclosure provides an electronic device, the electronic device includes: one or more processors; and a storage apparatus storing one or more programs, where the one or more programs, when executed by the one or more processors, cause the one or more processors to implement the method described in anyone of the implementations of the first aspect.

According to a fourth aspect, some embodiments of the present disclosure provides a computer readable medium storing a computer program, wherein when the program is executed by a processor, the method described in any one of the implementations of the first aspect is implemented.

According to the method and apparatus for inspecting a burr of an electrode slice provided in the above embodiments of the present disclosure, a to-be-inspected image of an electrode slice is input into a pre-trained burr instance segmentation model, to obtain an inspection result for characterizing whether the electrode slice displayed in the to-be-inspected image of the electrode slice has a burr and the contour of the burr. Where the burr instance segmentation model is used to characterize a corresponding relationship between the image of the electrode slice and the inspection result and the contour. In response to the inspection result characterizing that the electrode slice displayed in the to-be-inspected image of the electrode slice image has a burr, prompt information for characterizing that the electrode slice displayed in the to-be-inspected image of the electrode slice image has the burr is output. Thus, inspection on burrs of electrode slices based on instance segmentation is realized. Compared with manual inspection, the efficiency of burr inspection is improved.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
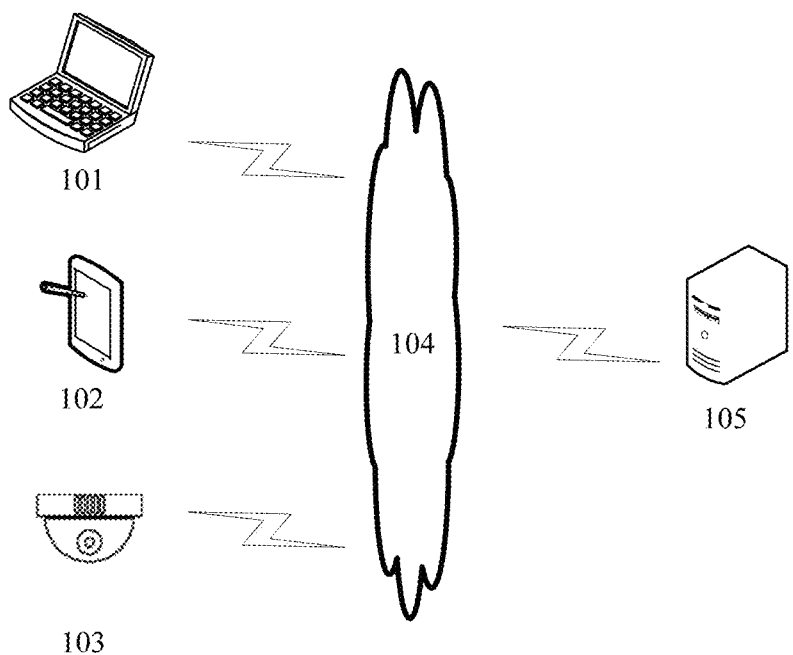
FIG. 1 is an architectural diagram of an example system to which some embodiments of the present disclosure can be applied.

FIG. 1 shows an example system architecture 100 to which a method for inspecting a burr of an electrode slice or an apparatus for inspecting a burr of an electrode slice that some embodiments of the present disclosure may be applied.

As shown in FIG. 1, the system architecture 100 may include a terminal device 101, 102 or 103, a network 104, and a server 105. The network 104 serves as a medium providing a communication link between the terminal device 101, 102 or 103 and the server 105. The network 104 may include various types of connections, such as wired or wireless communication links, or optical fiber cables.

The terminal device 101, 102 or 103 may interact with the server 105 through the network 104 to receive or send messages, etc. The terminal device 101, 102 or 103 may be installed with various client applications, such as photographing applications, picture processing applications, search applications, instant messaging tools, e-mail clients, and social platform software.

The terminal device 101, 102 or 103 may be hardware or software. When the terminal device 101, 102 or 103 is hardware, the terminal device may be various devices supporting photography or image storage, including but not limited to a camera, a video camera, a smart phone, a tablet computer, a laptop computer, a desktop computer, etc. When the terminal device 101, 102 or 103 is hardware, the terminal device may be installed in the above-listed electronic devices. The terminal device may be implemented as a plurality of software programs or software modules (e.g., for providing distributed services), or as a single software program or software module. Specific limitations are not provided here.

The server 105 may be a server providing various services, for example, a background server for inspecting an image sent by the terminal device 101, 102 or 103. The background server may inspect the received image, and can output prompt information based on the inspection result.

It should be noted that the method for inspecting a burr of an electrode slice according to some embodiments of the present disclosure is generally executed by the server 105. Accordingly, the apparatus for inspecting a burr of an electrode slice is generally provided in the server 105.

It should be noted that the server may be hardware or software. When the server is hardware, the server may be implemented as a distributed server cluster composed of multiple servers, or implemented as a single server. When the server is software, the server may be implemented as a plurality of software programs or software modules (e.g., for providing distributed services), or as a single software program or software module. Specific limitations are not provided here.

It should be understood that the numbers of the terminal devices, the network and the server in FIG. 1 are merely illustrative. Any number of terminal devices, networks and servers may be provided based on actual requirements.

Figure 2:
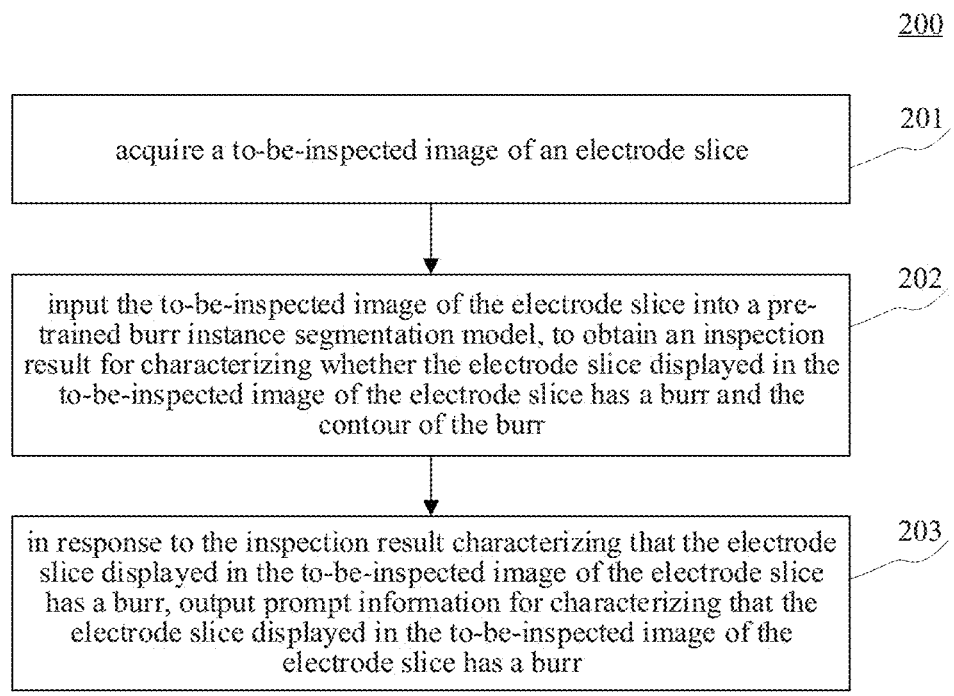
FIG. 2 is a flowchart of a method for inspecting a burr of an electrode slice according to an embodiment of the present disclosure.

Further referring to FIG. 2, a flow 200 of a method for inspecting a burr of an electrode slice according to an embodiment of the present disclosure is shown. The method for inspecting a burr of an electrode slice includes the following steps:

Step 201: acquiring a to-be-inspected image of an electrode slice.

In the present embodiment, the executing body (for example, the server shown in FIG. 1) of the method for inspecting a burr of an electrode slice may acquire the to-be-inspected image of the electrode slice from a terminal device in communication connection therewith through a wired or wireless connection. The to-be-inspected image of the electrode slice may be any image of the electrode slice. The to-be-inspected image of the electrode slice may be specified by a technician or screened according to certain condition. In practice, as an example, the terminal device may shoot a to-be-inspected electrode slice to obtain an image of the electrode slice. In addition, the to-be-inspected image of the electrode slice may also be stored locally in the executing body. At this time, the executing body may directly acquire the to-be-inspected image of the electrode slice locally.

Step 202: inputting the to-be-inspected image of the electrode slice into a pre-trained burr instance segmentation model, to obtain an inspection result for characterizing whether the electrode slice displayed in the to-be-inspected image of the electrode slice has a burr and contour of the burr.

In the present embodiment, the executing body may input the to-be-inspected image of the electrode slice acquired in step 201 into the pre-trained burr instance segmentation model. The burr instance segmentation model is used to characterize the corresponding relationship between the image of the electrode slice and the inspection result and the contour. Specifically, the burr instance segmentation model may be obtained by training based on various instance segmentation networks. For each pixel in the image, the instance segmentation model determines an instance to which the pixel belongs. That is to say, the burr instance segmentation model can not only determine whether an image of the electrode slice displays a burr, but also can distinguish different burrs displayed in the image if multiple burrs are displayed in the electrode slice image.

In the present embodiment, as an example, the burr instance segmentation model may be trained by the following steps:

Step 1: acquiring an open-source artificial neural network for instance segmentation as an initial burr instance segmentation model. For example, the artificial neural network for instance segmentation may be Mask R-CNN, Deep Mask, or the like.

Step 2: acquiring a training sample set. Each training sample may include a sample electrode slice image, inspection result for characterizing whether the electrode slice displayed in the to-be-inspected image of the electrode slice has a burr, and contour of the burr.

In practice, sample electrode slice images may be obtained in a variety of ways. As an example, images of battery slices may be collected using an image acquisition device such as a video camera. In practice, images of battery slices may be collected under different shooting conditions (e.g., different angles, light, filters, x scopes, focal lengths, etc.), so that the richness of training sample data is increased, and the trained model has high robustness for the images of the battery slices under different shooting conditions. After the sample electrode slice images are obtained, inspection result and contour of the burrs corresponding to each sample electrode slice image may be obtained by manual labeling.

Step 3: training, using a machine learning method, to obtain the burr instance segmentation model, with a sample electrode slice image of a training sample in the training sample set as an input of the initial burr instance segmentation model and the inspection result and the contour of the burr corresponding to the input sample electrode slice image as a desired output of the initial burr instance segmentation model.

In this step, as an example, the initial burr instance segmentation model may be trained based on a preset loss function. The loss function may be used to denote the difference between the inspection result and contour of a burr output by the initial burr instance segmentation model during the training process and the inspection result and contour of the burr corresponding to the input sample electrode slice image in the training sample. Parameters of the initial burr instance segmentation model are adjusted based on the value of the loss function obtained each time. Moreover, the training may be ended when it is determined that the values of the loss function during consecutive two or more trainings are smaller than a certain threshold, and the initial burr instance segmentation model obtained at this time is used as the burr instance segmentation model.

In the present embodiment, as another example, the burr instance segmentation model may include a feature extraction layer, a region proposal network, and a prediction network. The feature extraction layer may be a simple convolutional neural network (for example, ResNet50 or ResNet101). Lower layers in the feature extraction layer may extract low-level features (e.g., edge lines, etc.). Higher layers may extract advanced features (e.g., people, articles, etc.). The feature extraction layer extracts feature maps of an image, and may input the extracted feature maps into the region proposal network. The region proposal network may calculate whether the image contains a specific object. If an object is contained, the category and bounding box of the object may be determined by the prediction network. If an object is not contained, the image may no longer be classified. In this way, the three networks may form the main structure of the burr instance segmentation model. The network structure may also be adjusted correspondingly to meet actual needs. As an example, a network for feature combination may also be included to combine the extracted features.

Step 203: outputting, in response to the inspection result characterizing that the electrode slice displayed in the to-be-inspected image of the electrode slice has a burr, prompt information for characterizing that the electrode slice displayed in the to-be-inspected image of the electrode slice has a burr.

In the present embodiment, the executing body can obtain the inspection result of the to-be-inspected image of the electrode slice and contour of the burr (if any) through step 202. On the basis of this, in response to the inspection result characterizing that the electrode slice displayed in the to-be-inspected image of the electrode slice has a burr, the executing body can output prompt information for characterizing that the electrode slice displayed in the to-be-inspected image of the electrode slice has a burr. The prompt information may be information in various forms. For example, the prompt information may be text information. For another example, the prompt information may be voice information. In addition, the prompt information may also be instructions. For example, the prompt information may be an instruction for triggering a robot arm to pick up the electrode slice. For another example, the prompt information may also be an instruction for triggering log recording.

In some optional implementations of the present embodiment, the method for inspecting a burr of an electrode slice may further include: acquiring a target image of the electrode slice; adjusting the size of the target image of the electrode slice to a preset size; and determining the adjusted target image of the electrode slice as the to-be-inspected image of the electrode slice.

Figure 3:
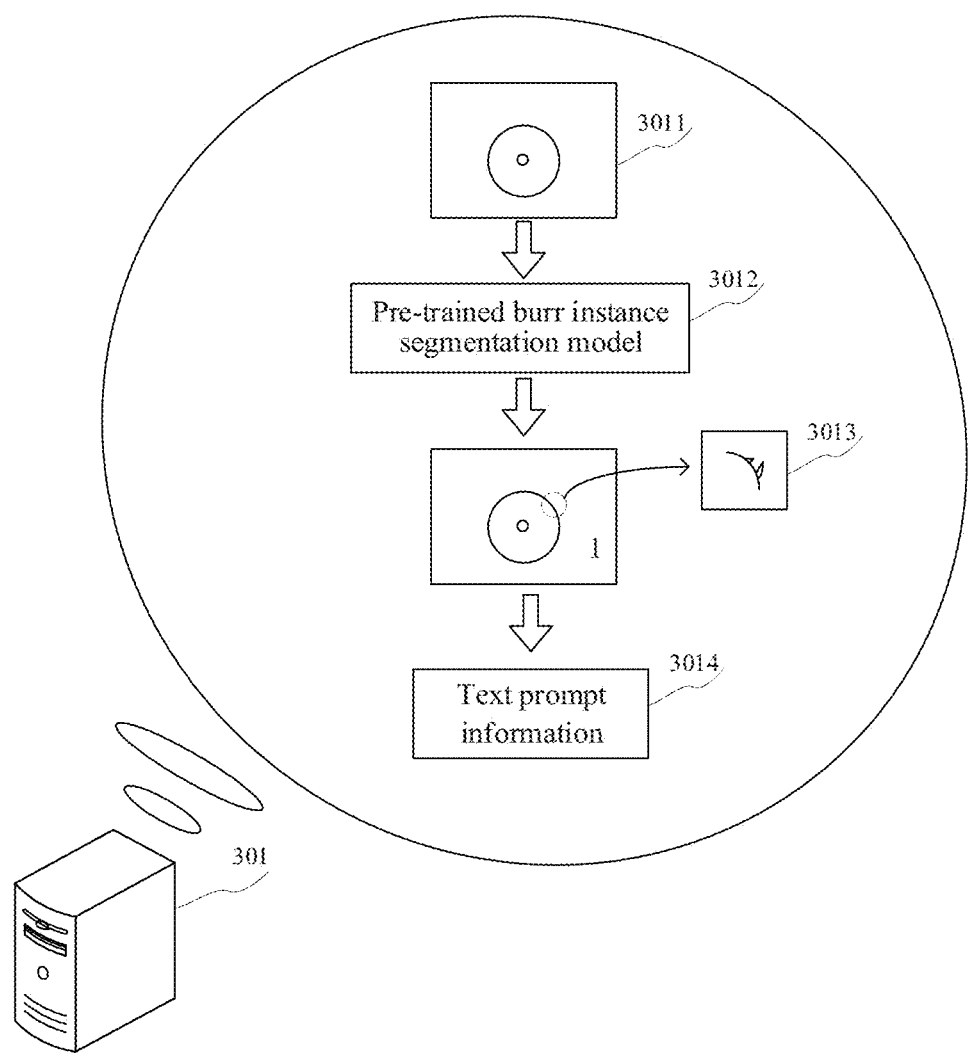
FIG. 3 is a flowchart of an application scenario of the method for inspecting a burr of an electrode slice according to some embodiments of the present disclosure.

Further refer to FIG. 3, which is a schematic diagram of an application scenario of the method for inspecting a burr of an electrode slice according to the present embodiment. In the application scenario of FIG. 3, the executing body of the method for inspecting a burr of an electrode slice may be a server 301. The server 301 may first acquire a to-be-inspected image 3011 of an electrode slice. Then, the to-be-inspected image 3011 of the electrode slice is input into a pre-trained burr instance segmentation model 3012, to obtain an inspection result "1" for characterizing that the electrode slice displayed in the to-be-inspected image of the electrode slice has burrs and the contours of the burrs, as shown in a partially enlarged view 3013. In response to the inspection result characterizing that the electrode slice displayed in the to-be-inspected image of the electrode slice has burrs, the server 301 may output text prompt information 3014 for characterizing that the electrode slice displayed in the to-be-inspected image of the electrode slice has burrs.

According to some embodiments of the present disclosure, a to-be-inspected image of an electrode slice is input into a pre-trained burr instance segmentation model to obtain an inspection result for characterizing whether the electrode slice displayed in the to-be-inspected image of the electrode slice has a burr and the contour of the burr. In response to the inspection result characterizing that the electrode slice displayed in the to-be-inspected image of the electrode slice image has a burr, prompt information for characterizing that the electrode slice displayed in the to-be-inspected image of the electrode slice image has the burr is output. Thus, inspection on burrs of electrode slices based on instance segmentation is realized. Compared with manual inspection, the efficiency of burr inspection is improved.

Figure 4:
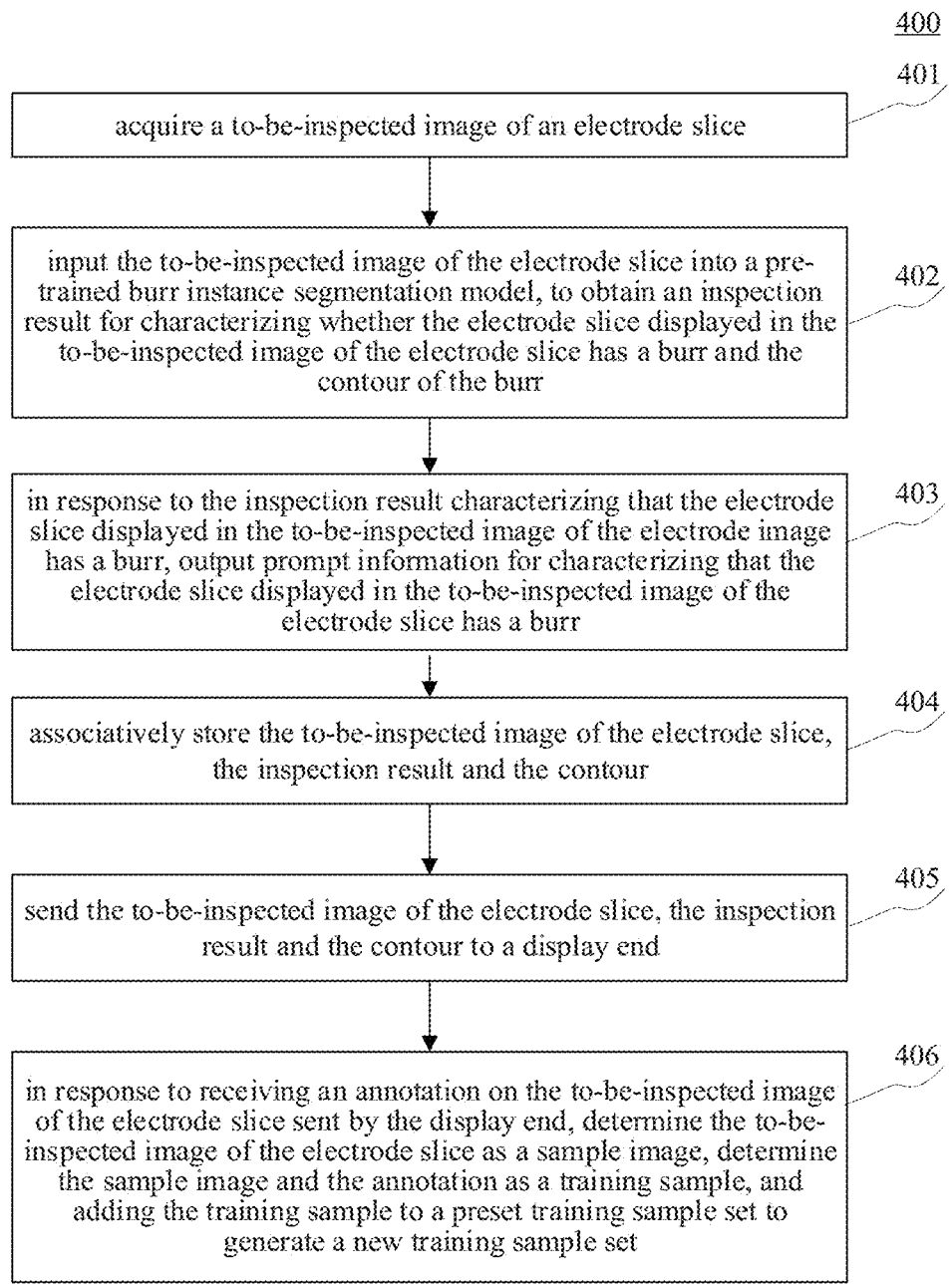
FIG. 4 is a flowchart of the method for inspecting a burr of an electrode slice according to another embodiment of the present disclosure.

Further referring to FIG. 4, a flow 400 of the method for inspecting burrs of an electrode slice according to another embodiment of the present disclosure is shown. The flow 400 of the method for inspecting a burr of an electrode slice includes the following steps:

Step 401: acquiring a to-be-inspected image of an electrode slice.

Step 402: inputting the to-be-inspected image of the electrode slice into a pre-trained burr instance segmentation model to obtain an inspection result for characterizing whether the electrode slice displayed in the to-be-inspected image of the electrode slice has a burr and the contour of the burr.

Step 403: outputting, in response to the inspection result characterizing that the electrode slice displayed in the to-be-inspected image of the electrode slice has the burr, prompt information for characterizing that the electrode slice displayed in the to-be-inspected image of the electrode slice has the burr.

In the present embodiment, the specific processing of steps 401-403 and the technical effects thereof may be referred to steps 201-203 in the corresponding embodiment of FIG. 2, and details are not described herein again.

Step 404: associatively storing the to-be-inspected image of the electrode slice, the inspection result and the contour.

In the present embodiment, the executing body of the method for inspecting a burr of an electrode slice may associatively store the to-be-inspected image of the electrode slice and the inspection result and contour of the burr obtained in step 402.

Step 405: sending the to-be-inspected image of the electrode slice, the inspection result and the contour to a display end.

In the present embodiment, the executing body may further send the to-be-inspected image of the electrode slice and the inspection result and contour of the burr obtained in step 402 to the display end. The display end may be hardware or software. When the display end is hardware, the display end may be a build-in display device of the executing body, or other display device in communication connection with the executing body. When the display end is software, the display end may be installed in a display device. Accordingly, a technician can see, on the display end, the to-be-inspected image of the electrode slice, the inspection result and the contour.

Certain error may exist between the inspection result and the contour of the burr obtained in step 402 and the real inspection result and contour of the burr of the to-be-inspected image. Therefore, by sending the to-be-inspected image of the electrode slice, the inspection result and the contour to the display end, the technician can determine whether the difference between the inspection result and contour of the burr obtained in step 402 and the real inspection result and contour of the burr of the to-be-inspected image is greater than a preset threshold. If greater than the preset threshold, the technician can input the real inspection result and contour of the burr as an annotation into the display end.

Step 406: in response to receiving the annotation on the to-be-inspected image of the electrode slice sent by the display end, determining the to-be-inspected image of the electrode slice as a sample image, determining the sample image and the annotation as a training sample, and adding the training sample to a preset training sample set to generate a new training sample set.

In the present embodiment, in response to receiving the annotation on the to-be-inspected image of the electrode slice sent by the display end, the to-be-inspected image of the electrode slice is determined as a sample image. In addition, the sample image and the annotation input by the technician are determined as a training sample, and the determined training sample is added to the preset training sample set to generate a new training sample set.

In some optional implementations of the present embodiment, the burr instance segmentation model may be updated by the following steps: for a training sample in the new training sample set, training, using a machine learning method, to obtain a new burr instance segmentation model, with the sample image of the training sample as an input and the input annotation of the sample image as a desired output.

It can be seen from FIG. 4 that, compared with corresponding embodiments of FIG. 2, the flow 400 of the method for inspecting a burr of an electrode slice in the present embodiment adds the step of associatively storing the to-be-inspected image of the electrode slice, the inspection result and the contour. On this basis, by displaying the to-be-inspected image of the electrode slice, the inspection result and the contour, the technician can identify the inspection result and contour which are of large error. Further, the technician may also input a real annotation into the display end. A new training sample set is generated accordingly to facilitate subsequent optimization of the burr instance segmentation model.

Figure 5:
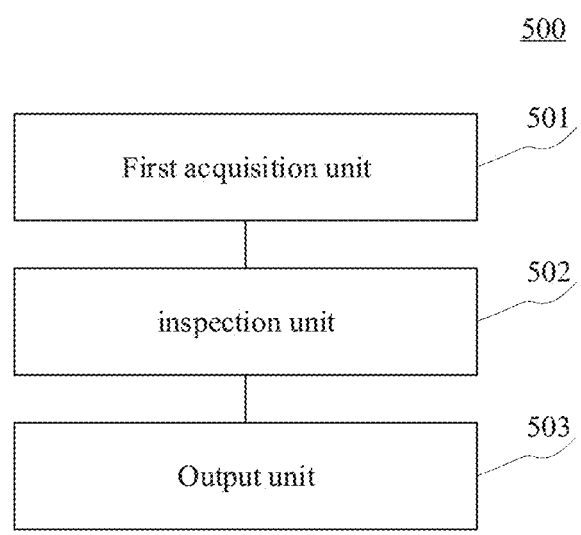
FIG. 5 is a schematic structural diagram of an apparatus for inspecting a burr of an electrode slice according to an embodiment of the present disclosure.

Further referring to FIG. 5, as an implementation of the method shown in the above figures, the present disclosure provides an embodiment of an apparatus for inspecting a burr of an electrode slice. Certain embodiments of the apparatus corresponds to the embodiment of the method shown in FIG. 2, and the apparatus may be applied to various electronic devices.

As shown in FIG. 5, the apparatus 500 for inspecting a burr of an electrode slice according to the present embodiment includes a first acquisition unit 501, an inspection unit 502, and an output unit 503. The first acquisition unit 501 is configured to acquire a to-be-inspected image of an electrode slice. The inspection unit 502 is configured to input the to-be-inspected image of the electrode slice into a pre-trained burr instance segmentation model, to obtain an inspection result for characterizing whether the electrode slice displayed in the to-be-inspected image of the electrode slice has a burr and the contour of the burr, where the burr instance segmentation model is used to characterize the corresponding relationship between the image of the electrode slice and the inspection result and the contour. The output unit 503 is configured to output, in response to the inspection result characterizing that the electrode slice displayed in the to-be-inspected image of the electrode slice image has a burr, prompt information for characterizing that the electrode slice displayed in the to-be-inspected image of the electrode slice has the burr.

In some optional implementation manners of the present embodiment, the apparatus 500 may further include a storage unit (not shown). The storage unit is configured to associatively store the to-be-inspected image of the electrode slice, the inspection result and the contour.

In some optional implementations of the present embodiment, the apparatus 500 may further include a sending unit (not shown) and a generation unit (not shown). The sending unit is configured to send the to-be-inspected image of the electrode slice, the inspection result and the contour to a display end. The generation unit is configured to determine, in response to receiving an annotation on the to-be-inspected image of the electrode slice sent by the display end, the to-be-inspected image of the electrode slice as a sample image, determine the sample image and the annotation as a training sample, and add the training sample to a preset training sample set to generate a new training sample set.

In some optional implementations of the present embodiment, the burr instance segmentation model is updated by the following steps: for a training sample in the new training sample set, training, using a machine learning method, to obtain a new burr instance segmentation model, with the sample image of the training sample as an input and the input annotation on the sample image as a desired output.

In some optional implementations of the present embodiment, the apparatus 500 may further include a second acquisition unit (not shown), an adjustment unit (not shown), and a determination unit (not shown). The second acquisition unit is configured to acquire a target image of the electrode slice image. The adjustment unit is configured to adjust the size of the target image of the electrode slice to a preset size. The determination unit is configured to determine the adjusted target image of the electrode slice as the to-be-inspected image of the electrode slice.

In the present embodiment, the specific implementation of the first acquisition unit 501, the inspection unit 502, and the output unit 503 of the apparatus 500 for inspecting a burr of an electrode slice and the technical effects thereof may be referred to steps 201-203 in the corresponding embodiment of FIG. 2, and details are not described herein again.

In the present embodiment, an inspection unit 502 may input a to-be-inspected image of an electrode slice acquired by a first acquisition unit 501 into a pre-trained burr instance segmentation model to obtain inspection result for characterizing whether the electrode slice displayed in the to-be-inspected image of the electrode slice has a burr and the contour of the burr. In response to the inspection result characterizing that the electrode slice displayed in the to-be-inspected image of the electrode slice has a burr, an output unit 503 may output prompt information for characterizing that the electrode slice displayed in the to-be-inspected image of the electrode slice has a burr. Thus, inspection on burrs of an electrode slice based on instance segmentation is realized. Compared with manual inspection, the efficiency of burr inspection is improved.

Figure 6:
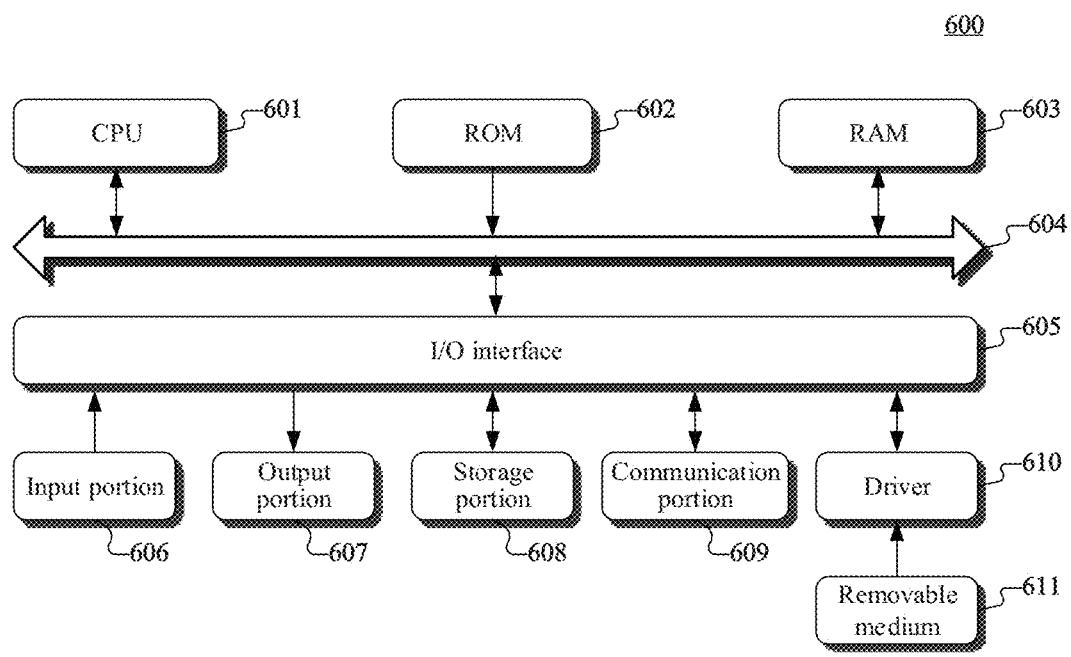
FIG. 6 is a schematic structural diagram of a system adapted to implement an electronic device according to some embodiments of the present disclosure.

Further referring to FIG. 6, a schematic structural diagram of a system 600 of an electronic device adapted to implement some embodiments of the present disclosure is shown. The electronic device shown in FIG. 6 is just an example, and should not bring any limitation to the function and usage range of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to some embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 609, or may be installed from the storage portion 608, or may be installed from the ROM 602. The computer program, when executed by the central processing unit (CPU) 601, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. Amore specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in some embodiments of the present disclosure may be implemented by means of software or hardware. The described units or modules may also be provided in a processor, for example, described as: a processor, comprising a first acquisition unit, an inspection unit and a an output unit, where the names of these units or modules do not in some cases constitute a limitation to such units or modules themselves. For example, the first acquisition unit may also be described as "a unit for acquiring a to-be-inspected image of the electrode slice."

In another aspect, the present disclosure further provides a computer-readable medium. The computer-readable medium may be a computer-readable medium included in the electronic device in the above described embodiments, or a stand-alone computer-readable medium not assembled into the electronic device. The computer-readable medium stores one or more programs. The one or more programs, when executed by the electronic device, cause the electronic device to: acquire a to-be-inspected image of the electrode slice; input the to-be-inspected image of the electrode slice into a pre-trained burr instance segmentation model, to obtain an inspection result for characterizing whether the electrode slice displayed in the to-be-inspected image of the electrode slice has a burr and a contour of the burr, wherein the burr instance segmentation model is used to characterize a corresponding relationship between the image of the electrode slice and the inspection result and the contour; and output, in response to the inspection result characterizing that the electrode slice displayed in the to-be-inspected image of the electrode slice has the burr, prompt information for characterizing that the electrode slice displayed in the to-be-inspected image of the electrode slice has the burr.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for inspecting a burr of an electrode slice, comprising:
    acquiring a to-be-inspected image of the electrode slice;
    inputting the to-be-inspected image of the electrode slice into a pre-trained burr instance segmentation model, to obtain an inspection result for characterizing whether the electrode slice displayed in the to-be-inspected image of the electrode slice has a burr and a contour of the burr, wherein the burr instance segmentation model is used to characterize a corresponding relationship between the image of the electrode slice and the inspection result and the contour; and
    outputting, in response to the inspection result characterizing that the electrode slice displayed in the to-be-inspected image of the electrode slice has the burr, prompt information for characterizing that the electrode slice displayed in the to-be-inspected image of the electrode slice has the burr.

2. The method according to claim 1, wherein the method further comprises:
    associatively storing the to-be-inspected image of the electrode slice, the inspection result and the contour.

3. The method according to claim 2, wherein the method further comprises:

sending the to-be-inspected image of the electrode slice, the inspection result and the contour to a display end; and in response to receiving an annotation on the to-be-inspected image of the electrode slice sent by the display end, determining the to-be-inspected image of the electrode slice as a sample image, determining the sample image and the annotation as a training sample, and adding the training sample to a preset training sample set to generate a new training sample set.

4. The method according to claim 3, wherein the burr instance segmentation model is updated by the following steps:

for a training sample in the new training sample set, training, using a machine learning method, to obtain a new burr instance segmentation model, with the sample image of the training sample as an input and the input annotation on the sample image as a desired output.

5. The method according to claim 1, wherein the method further comprises:

acquiring a target image of the electrode slice;

adjusting the size of the target image of the electrode slice to a preset size; and determining the adjusted target image of the electrode slice as the to-be-inspected image of the electrode slice.

6. An apparatus for inspecting a burr of an electrode slice, comprising:

at least one processor; and a memory storing instructions, the instructions when executed by the at least one processor, cause the at least one processor to perform operations, the operations comprising:

acquiring a to-be-inspected image of the electrode slice;

inputting the to-be-inspected image of the electrode slice into a pre-trained burr instance segmentation model, to obtain an inspection result for characterizing whether the electrode slice displayed in the to-be-inspected image of the electrode slice has a burr and a contour of the burr, wherein the burr instance segmentation model is used to characterize a corresponding relationship between the image of the electrode slice and the inspection result and the contour; and outputting, in response to the inspection result characterizing that the electrode slice displayed in the to-be-inspected image of the electrode slice has the burr, prompt information for characterizing that the electrode slice displayed in the to-be-inspected image of the electrode slice has the burr.

7. The apparatus according to claim 6, wherein the operations further comprise:

associatively storing the to-be-inspected image of the electrode slice, the inspection result and the contour.

8. The apparatus according to claim 7, wherein the operations further comprise:

sending the to-be-inspected image of the electrode slice, the inspection result and the contour to a display end; and determining, in response to receiving an annotation on the to-be-inspected image of the electrode slice sent by the display end, the to-be-inspected image of the electrode slice as a sample image, determining the sample image and the annotation as a training sample, and adding the training sample to a preset training sample set to generate a new training sample set.

9. The apparatus according to claim 8, wherein the burr instance segmentation model is updated by the following steps:

for a training sample in the new training sample set, training, using a machine learning method, to obtain a new burr instance segmentation model, with the sample image of the training sample as an input and the input annotation on the sample image as a desired output.

10. The apparatus according to claim 6, wherein the operations further comprise:

acquiring a target image of the electrode slice;

adjusting the size of the target image of the electrode slice to a preset size; and determining the adjusted target image of the electrode slice as the to-be-inspected image of the electrode slice.

11. A non-transitory computer readable medium storing a computer program, wherein when the program is executed by a processor, causes the processor to perform operations, the operations comprising:

acquiring a to-be-inspected image of the electrode slice;

inputting the to-be-inspected image of the electrode slice into a pre-trained burr instance segmentation model, to obtain an inspection result for characterizing whether the electrode slice displayed in the to-be-inspected image of the electrode slice has a burr and a contour of the burr, wherein the burr instance segmentation model is used to characterize a corresponding relationship between the image of the electrode slice and the inspection result and the contour; and outputting, in response to the inspection result characterizing that the electrode slice displayed in the to-be-inspected image of the electrode slice has the burr, prompt information for characterizing that the electrode slice displayed in the to-be-inspected image of the electrode slice has the burr.

12. The medium according to claim 11, wherein the operations further comprise:

associatively storing the to-be-inspected image of the electrode slice, the inspection result and the contour.

13. The medium according to claim 12, wherein the operations further comprise:

sending the to-be-inspected image of the electrode slice, the inspection result and the contour to a display end; and in response to receiving an annotation on the to-be-inspected image of the electrode slice sent by the display end, determining the to-be-inspected image of the electrode slice as a sample image, determining the sample image and the annotation as a training sample, and adding the training sample to a preset training sample set to generate a new training sample set.

14. The medium according to claim 13, wherein the burr instance segmentation model is updated by the following steps:

for a training sample in the new training sample set, training, using a machine learning method, to obtain a new burr instance segmentation model, with the sample image of the training sample as an input and the input annotation on the sample image as a desired output.

15. The medium according to claim 11, wherein the operations further comprise:

acquiring a target image of the electrode slice;

adjusting the size of the target image of the electrode slice to a preset size; and determining the adjusted target image of the electrode slice as the to-be-inspected image of the electrode slice.

16. The method according to claim 2, wherein the method further comprises:

acquiring a target image of the electrode slice;

adjusting the size of the target image of the electrode slice to a preset size; and determining the adjusted target image of the electrode slice as the to-be-inspected image of the electrode slice.

17. The method according to claim 3, wherein the method further comprises:

acquiring a target image of the electrode slice;

adjusting the size of the target image of the electrode slice to a preset size; and determining the adjusted target image of the electrode slice as the to-be-inspected image of the electrode slice.

18. The method according to claim 4, wherein the method further comprises:

acquiring a target image of the electrode slice;

adjusting the size of the target image of the electrode slice to a preset size; and determining the adjusted target image of the electrode slice as the to-be-inspected image of the electrode slice.

* * * * *